(12) United States Patent
Gresser (10) Patent No.: US 9,816,535 B2
(45) Date of Patent: Nov. 14, 2017

(54) HYDROPNEUMATIC DEVICE FOR PRESSURE TRANSMISSION AND RIVETING DEVICE

(71) Applicant: Tox Pressotechnik GmbH & Co. KG, Weingarten (DE)

(72) Inventor: Manfred Gresser, Baienfurt (DE)

(73) Assignee: Tox Pressotechnik GmbH & Co. KG, Weingarten (DE)

( * ) Notice: Subject to any disclaimer, the term of this patent is extended or adjusted under 35 U.S.C. 154(b) by 436 days.

(21) Appl. No.: 14/511,377

(22) Filed: Oct. 10, 2014

(65) Prior Publication Data
US 2015/0075157 A1    Mar. 19, 2015

Related U.S. Application Data

(63) Continuation of application No. PCT/EP2013/001089, filed on Apr. 13, 2013.

(30) Foreign Application Priority Data

May 8, 2012   (DE) .......................... 10 2012 008 902

(51) Int. Cl.
*F15B 7/00* (2006.01)
*F15B 11/032* (2006.01)
(Continued)

(52) U.S. Cl.
CPC .......... *F15B 11/0325* (2013.01); *B23Q 5/268* (2013.01); *F15B 11/032* (2013.01);
(Continued)

(58) Field of Classification Search
CPC ................................................. F15B 11/0325
See application file for complete search history.

(56) References Cited

U.S. PATENT DOCUMENTS 5,377,488 A * 1/1995 Malina ................ F15B 11/0325
60/560
6,354,082 B1    3/2002 Brieschke
(Continued)

FOREIGN PATENT DOCUMENTS

EP    0 288 719 A2    11/1988
WO   2006/002772 A2    1/2006

OTHER PUBLICATIONS

International Preliminary Report on Patentability (Application No. PCT/EP2013/001089) dated Nov. 20, 2014.
(Continued)

*Primary Examiner* — Michael Leslie
(74) *Attorney, Agent, or Firm* — Burr & Brown, PLLC (57) ABSTRACT

A device for riveting and a hydropneumatic device for pressure transmission, including a working piston and a transmitter piston in the form of a double-acting cylinder for transmitting pressure to the working piston, wherein a working stroke of the working piston in a working direction includes a first stroke and a subsequent second stroke, wherein the first stroke is controlled by means of pneumatic pressure acting on the working piston and the second stroke is controlled by means of pneumatic pressure acting on the transmitter piston, and wherein hydraulic fluid is displaced by the transmitter piston and the displaced hydraulic fluid effects the second stroke of the working piston. Regulation means having an actuating device are provided for regulating the pneumatic pressure on both sides of the double-acting cylinder of the transmitter piston such that the second stroke of the working piston is predefined by way of the regulation.

16 Claims, 7 Drawing Sheets

(51) Int. Cl.
*F15B 11/072* (2006.01)
*B23Q 5/26* (2006.01)
(52) U.S. Cl.
CPC ..... *F15B 11/0725* (2013.01); *F15B 2211/216* (2013.01); *F15B 2211/30525* (2013.01); *F15B 2211/3144* (2013.01); *F15B 2211/513* (2013.01); *F15B 2211/6313* (2013.01); *F15B 2211/6336* (2013.01); *F15B 2211/76* (2013.01); *F15B 2211/7653* (2013.01)

(56) References Cited

U.S. PATENT DOCUMENTS

| | | | | |
|---|---|---|---|---|
| 6,523,451 | B1* | 2/2003 | Liao | F15B 9/09 91/363 R |
| 6,581,379 | B2* | 6/2003 | Nomura | F15B 11/0325 60/563 |
| 6,971,237 | B2* | 12/2005 | Geiger | F15B 11/0325 60/545 |
| 7,698,893 | B2* | 4/2010 | Langeder | F15B 11/0325 60/534 |
| 2002/0029569 | A1 | 3/2002 | Nomura et al. | |
| 2007/0289440 | A1 | 12/2007 | Langeder | |

OTHER PUBLICATIONS

International Search Report and Written Opinion (Application No. PCT/EP2013/001089) dated Jul. 4, 2013.

* cited by examiner

HYDROPNEUMATIC DEVICE FOR PRESSURE TRANSMISSION AND RIVETING DEVICE

CROSS REFERENCE TO RELATED APPLICATION

This application is a continuation of International Application No. PCT/EP2013/001089 filed Apr. 13, 2013, which designated the United States, and claims the benefit under 35 USC §119(a)-(d) of German Application No. 10 2012 008 902.3 filed May 8, 2012, the entireties of which are incorporated herein by reference.

FIELD OF THE INVENTION

The present invention relates to a hydropneumatic device for pressure transmission and riveting device.

BACKGROUND OF THE INVENTION

Hydropneumatic devices for pressure transmission, used for example for riveting devices, are already known in a wide variety of embodiments.

Such devices have a working piston and a transmitter piston for transmitting pressure to the working piston, wherein, for the provision of a working force by the working piston, the transmitter piston, which is subjected to pneumatic action, dips into a hydraulic fluid and displaces hydraulic fluid in accordance with the positive displacement principle, and wherein the working piston, in a force stroke, is moved in a working direction by the displaced hydraulic fluid with a force transmission ratio corresponding to the effective piston surface areas.

Also provided is an accumulator piston which, before the force stroke, assists a rapid traverse movement of the working piston during a first stroke and, during a rapid-traverse stroke, assists the replenishment flow of hydraulic fluid.

Furthermore, between the transmitter piston and the accumulator piston, a pneumatic pressure may be realized which effects a pneumatic return movement of the transmitter piston when the operating pressure no longer acts on the transmitter piston. Furthermore, the accumulator piston is also permanently subjected to the action of a pneumatic initial pressure such that the hydraulic fluid volume present in the accumulator piston in an accumulator chamber is subjected to the corresponding pressure, or a preload.

For the return movement of the transmitter piston, a pneumatic pressure which is reduced in relation to the operating pressure is predefined on a return stroke side of the transmitter piston, such that the pneumatic return movement of the transmitter piston is effected by means of the pressure between the accumulator piston and the transmitter piston, this also being referred to as an air spring.

The air spring pressure acts permanently on the transmitter piston and accumulator piston and is always constant regardless of the state of movement of the pistons subjected thereto, and is, for example, approximately 0.6 bar.

In the case of a mechanical spring that may alternatively be provided, which spring acts under a preload between the transmitter piston and the accumulator piston, different pressures or forces always act as a result of the different operating states, in contrast to the situation with the air spring.

SUMMARY OF THE INVENTION

It is an object of the present invention to improve hydropneumatic devices for pressure transmission, or corresponding riveting devices, in particular in order to achieve optimum positioning, which is adapted to changed force stroke requirements, of a working piston.

The present invention is based initially on a hydropneumatic device for pressure transmission, having a working piston and having a transmitter piston, which is in the form of a double-acting cylinder, for transmitting pressure to the working piston, wherein a working stroke of the working piston in a working direction comprises a first stroke and a subsequent second stroke, wherein the first stroke can be controlled by means of the pneumatic action of pressure on the working piston and the second stroke can be controlled by means of the pneumatic action of pressure on the transmitter piston, and wherein hydraulic fluid is displaced by the transmitter piston and the displaced hydraulic fluid effects the second stroke of the working piston. The first stroke of the working piston in the working direction may, in particular, be regarded as a rapid-traverse stroke, which is followed by the second stroke in the same direction, the second stroke corresponding to a force stroke. The working stroke or the force stroke is followed by a pneumatic return movement of the working piston, wherein the hydraulic fluid thus displaced acts on the transmitter piston such that a return movement of the latter is also effected.

The essence of the present invention lies in the fact that regulation means having an actuating device are provided for regulating the pneumatic pressure on both sides of the double-acting cylinder of the transmitter piston such that the second stroke of the working piston can be predefined by way of the regulation. It is advantageously thus possible to realize the precise positioning of the working piston in the high-pressure state or in the second stroke by means of pneumatically regulated, in particular servo-pneumatically regulated, positioning of the transmitter piston. The transmitter piston advantageously performs the generation of force during the force stroke. By means of regulated positioning, the force stroke and the positioning and movement of the working piston can be adapted optimally to force stroke requirements that may be changed during the course of the force stroke.

The working piston can, for example, be stopped in an extremely short time in the force stroke, and the working piston can be moved into a precisely predefinable position, for example, with a desired movement profile.

The working piston is in the form of a double-acting cylinder, wherein both sides of the double-acting cylinder can be subjected to pneumatic action. Furthermore, a side of the working piston that faces toward the accumulator piston dips into the hydraulic fluid or the hydraulic fluid volume.

The regulation means can, for example, advantageously be provided retroactively on a known hydropneumatic pressure transmission device without significant conversion measures, wherein the regulation means can be integrated without any problems into the existing systems. If appropriate, it is possible in this way to dispense with components that have hitherto been necessary, such that overall, with the aid of the present invention, the hydropneumatic pressure transmission device can either have fewer components or be of a more compact construction in comparison with previous pressure transmission devices.

In particular, an accumulator piston is provided that is movable in a control chamber and is in the form of a double-acting cylinder, so that the accumulator piston, in the first stroke, assists a displacement of hydraulic fluid. The assistance is realized by way of the movement of the accumulator piston. The other side of the accumulator piston is subjected to a pneumatic action, for example, by a pressure regulator and a shuttle valve provided in the respective pneumatic line for rapid-traverse stroke assistance.

It is advantageously possible in this way for the rapid-traverse stroke of the working piston to be achieved by the working piston being moved relatively rapidly from a main position to a desired working position. In the process, the accumulator piston displaces a relatively large amount of hydraulic fluid, whereby the hydraulic fluid moves the working piston forward.

It is also advantageous for a chamber that accommodates the transmitter piston to be separated from a chamber that accommodates an accumulator piston. In this way, it is advantageously possible for the two sides of the transmitter piston to be subjected to pneumatic action in a regulated fashion. The pneumatic action of pressure on the accumulator piston remains unaffected by the pneumatic regulation of the transmitter piston. The air spring that acts on the accumulator piston can thus be set up independently without any problems. Also, with the separation of the chamber that accommodates the transmitter piston from the chamber that accommodates the accumulator piston, a mechanical spring may readily be realized as an alternative to the air spring. The separation may be realized, for example, by means of a fixed partition or an intermediate ring on the housing of the hydropneumatic device.

The actuating device of the regulation means advantageously comprises a multi-directional valve. It is possible in this way to realize desired different switching states and regulation stages. In particular, a compressed-air supply, which is connected to the multi-directional valve via a pneumatic line, can advantageously subject the two sides of the transmitter piston to the action of the compressed air or to pneumatic action. Here, each side of the double-acting cylinder of the transmitter piston is connected by way of a dedicated line to the multi-directional valve.

It is particularly advantageous for the actuating device of the regulation means to comprise precisely one multi-directional proportional valve, in particular a 5/3 directional proportional valve. It is thus advantageously possible for the transmitter piston to be advantageously regulated independent of the working piston.

By means of the hydraulic fluid that is displaced in accordance with the positive displacement principle and the effective surface areas of different size that are subject to hydraulic action, a relatively large force is exerted on the working piston. Owing to the proportional regulation of the transmitter piston by means of the 5/3 directional proportional valve, wherein the transmitter piston dips into the hydraulic fluid, and a movement of the working piston to a very precise position in the high-pressure chamber is now possible. This, by means of the transmission ratio, permits indirect, highly precise regulation of the working piston to a set value or target value.

It may alternatively be advantageous for the actuating device of the regulation means to comprise multiple interacting multi-directional valves, in particular two 3/2 directional proportional valves. This is advantageous, in particular, for relatively large nominal diameters of the hydropneumatic device for pressure transmission, for example for nominal diameters of ¾ inch and greater.

It is also advantageous for sensor means to be provided which have a sensor arrangement or sensors by means of which a value or a physical variable can be detected and provided to the regulator or to a unit superordinate to the regulator. The unit superordinate to the regulator is, for example, one of a control unit, computer and processing unit by means of which the regulation is realized.

Sensor means are advantageously provided which have a travel sensor arrangement by means of which a travel can be detected, wherein the travel is a regulating variable of the regulation means. It is thus advantageously possible to realize a travel-dependent regulation of the working piston. The travel is advantageously a stroke travel of the working piston, in particular, during the force stroke.

It is also advantageous for sensor means to be provided which have a force sensor arrangement by means of which a force can be detected, wherein the force is a regulating variable of the regulation means. The force that can be detected is advantageously a force detected at the working piston or a force situated in an area in which the force imparted by the working piston acts, for example, at elements that are adjacent to the working piston during the working stroke, in particular in the vicinity of a front end of the working piston.

In one advantageous modification of the present invention, sensor means are provided which have a pressure sensor arrangement by means of which a pressure can be detected, wherein the pressure is a regulating variable of the regulation means. The pressure sensor arrangement is advantageously designed to detect a liquid pressure in the hydraulic fluid and provide this detected pressure to the regulator. The liquid or hydraulic pressure in one of the high-pressure phase and during the force stroke is taken into consideration for the regulation.

In one advantageous variant of the present invention, the side of the accumulator piston, which is in the form of a double-acting cylinder, is subjected to pneumatic action that can be regulated. In this way, it is possible to set up an advantageous air spring, for example, by means of regulation with a pressure regulator and a shuttle valve for the rapid-traverse stroke assistance.

It may also be advantageous if the side of the accumulator piston, which is in the form of a double-acting cylinder, is subjected to pneumatic action that can be regulated by way of precisely those actuating means which effect the regulation of the pneumatic pressure on both sides of the double-acting cylinder of the transmitter piston. Accordingly, the air spring between the partition and the accumulator piston is also jointly regulated by one of the actuating means and the respective multi-directional valve. This is advantageous with regard to reduced usage of components in the arrangement, because it is possible, if appropriate, to dispense with parts such as, for example, a separate pressure regulator for the air spring. In particular, a 5/3 directional proportional valve can perform both the regulation of both sides of the transmitter piston and also the pressure regulation of the pneumatic chamber on the transmitter piston, if appropriate, with the integration of a shuttle valve for the rapid-traverse stroke assistance.

In one advantageous arrangement according to the present invention, the working piston is accommodated in a movable fashion in a working piston housing of a first structural unit which is separate from a second structural unit, which has an auxiliary piston housing in which the transmitter piston and the accumulator piston are accommodated, wherein the first and the second structural units communicate hydraulically with one another via a connecting section. Via the connecting section, a hydraulic chamber that exerts a load on the accumulator piston is connected to a hydraulic chamber that exerts a load on the working piston. It is thus possible for the two structural units, if these are provided in different configurations or designs, to be combined with one another in virtually any desired manner. Also, the two structural units can be better adapted to the external conditions, for example, individually positioned or also correspondingly spaced apart from one another, and, if appropriate, spaced apart further from one another. The connecting section or the hydraulic connection of the two structural units may be realized by means of a flexible connection, such as one or more of a high-pressure hose, and by means of a fixed or tubular hydraulic line, for example.

The present invention also relates to a device for one of clinching and riveting, having a driveable working piston for establishing one of a clinched arrangement and a riveted arrangement with a rivet element, where one of the hydropneumatic devices according to the present invention described above is provided. It is possible in this way to realize a clinching or riveting device that has the above-mentioned advantages. The present invention relates, in particular, to one of a clinching device and a riveting device for connecting two or more component layers, wherein the riveting device is designed, in particular, for riveting with a semi-tubular rivet or solid punch rivet.

During the riveting process, a punch element is, by means of the hydropneumatic device for pressure transmission, moved linearly in the direction of the component layers to be connected to one another, and a rivet element is introduced into the component layers to be connected to one another, with one of a shaping and a punching process taking place.

The present invention also encompasses a device for at least one of pressing, pressing-in, embossing, compacting, stamping, calking, clinching, punching and perforating, having a driveable working piston, wherein the device comprises a hydropneumatic device according to one of the embodiments mentioned above. In this way, with one of the aforementioned devices, which may be designed, for example, as a pressing, punching or clinching tool, it is possible to achieve the advantages of the present invention explained above.

BRIEF DESCRIPTION OF THE DRAWINGS

Further features and advantages of the invention will be explained in more detail on the basis of the exemplary embodiments according to the invention illustrated in the figures.

DETAILED DESCRIPTION OF THE INVENTION

In the figures, corresponding parts of different exemplary embodiments are denoted, in part, by the same reference numbers.

Figure 1:
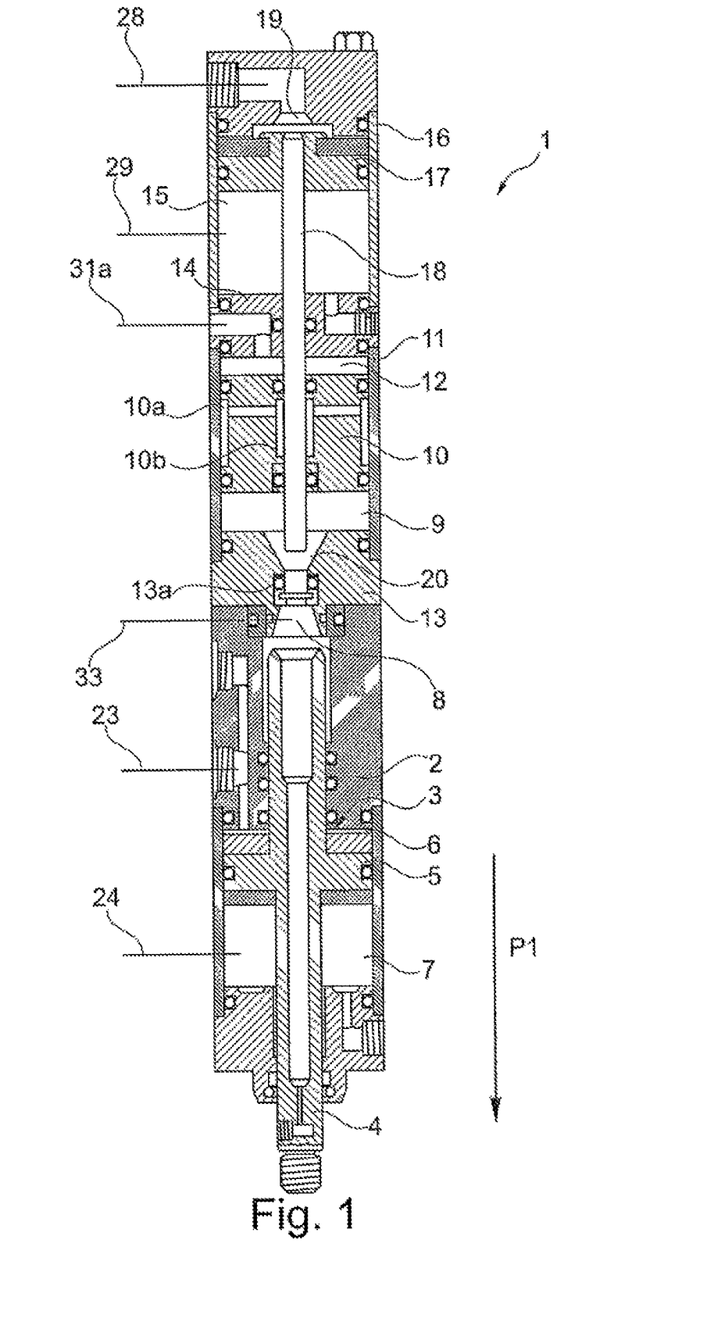
FIG. 1 shows a hydropneumatic device according to the invention for pressure transmission in section.

FIG. 1 shows, in section, a hydropneumatic device 1 according to the present invention for pressure transmission, also referred to hereinafter as pressure transmitter 1. The pressure transmitter 1 has a housing 2 in which a working piston 3 is arranged in a displaceable and radially sealed manner. The working piston 3, which in FIG. 1 is situated in an initial position, comprises a front section with a piston rod 4 projecting outward through the housing 2 and a further section with a part piston 5 which is formed integrally with the piston rod 4, is likewise radially sealed in the housing 2, and is movable jointly with the piston rod 4. The part piston 5 has a disk-shaped region of relatively large diameter and has a rear, rod-shaped region, piston section 5a, which adjoins the disk-shaped region and which is of a smaller diameter than the latter.

The part piston 5, or the disk-shaped region, separates two pneumatic chambers 6 and 7 from one another. When a corresponding pressure prevails in the rear pneumatic chamber 6, the working piston 3 is pushed downward in the direction of the arrow P1, or in the working direction.

The working piston 3 delimits, in a radially sealed manner, a working chamber 8 which is hydraulically connected via a constriction to an accumulator chamber 9 situated above. The accumulator chamber 9, which is filled with hydraulic fluid, is subjected to a load by an accumulator piston 10 that is capable of performing a displacement movement. The accumulator piston 10 is radially sealed off, and axially displaceable, with respect to a casing tube 11, wherein the casing tube 11 circumferentially surrounds a control chamber 12 situated above the accumulator piston 10. The control chamber 12 can be subjected to the action of pneumatic pressure. To optimize gas-liquid separation between the control chamber 12 and the accumulator chamber 9, an annular groove 10a is provided on the shell surface of the accumulator piston 10, and a further annular groove 10b is provided which is connected to the former annular groove, the annular grooves being connected to one another via a transverse bore. The inner annular groove 10b is formed on an inner wall of an inner bore that runs centrally through the accumulator piston 10.

The casing tube 11 is closed off, in the region of the accumulator chamber 9, by a housing part 13 of the housing 2 and, in the region of the control chamber 12, by a partition 14. The positionally fixed partition 14 is positioned between the control chamber 12 and a further pneumatic chamber 15 which is surrounded by a further casing tube 16, and a movable plunger piston 18 of a drive piston or transmitter piston 17 is led in a radially sealed manner through the partition 14. The plunger piston 18 is fixedly arranged centrally on the transmitter piston 17 and extends from the latter, at one side, downward, wherein the plunger piston 18 has a considerably smaller outer diameter than the transmitter piston 17. The plunger piston 18 is displaceable counter to the hydraulic pressure in the working chamber 8.

The plunger piston 18 extends through the partition 14 and the accumulator piston 10 and, in the initial position shown in FIG. 1, projects by way of its free end into the accumulator chamber 9. The transmitter piston 17, and the plunger piston 18, can be moved in the pneumatically driven fashion by pressurization, via an advance stroke line 28, of a drive chamber 19 that adjoins the transmitter piston 17. The transmitter piston 17 adjoins, at the space opposite the drive chamber 19, the transmitter piston return stroke chamber or further pneumatic chamber 15 which can be charged with pneumatic pressure via a return stroke line 29.

During a second stroke of the working piston or a high-pressure working movement, the drive chamber 19 can be pressurized such that the plunger piston 18, performing a stroke movement, protrudes into one of a constriction section and a connecting bore 20 that leads from the accumulator chamber 9 to the working chamber 8. By virtue of the front section of the plunger piston 18 protruding into the connecting bore 20, the connection between the accumulator chamber 9 and the working chamber 8 is blocked by means of a radial seal 13*a*. During the further stroke movement of the plunger piston 18 in the direction of the arrow P1, the plunger piston 18 protrudes further into the working chamber 8, whereby, owing to the relatively small plunger piston diameter, a relatively high working pressure is generated in the working chamber 8. The pressure corresponds, based on the pneumatic pressure acting on the transmitter piston 17, to the transmission ratio of the working surface areas of the transmitter piston 17 with respect to the plunger piston 18. In this way, a high force can be exerted on the piston rod 4 by means of the working piston 3.

For the return stroke of the plunger piston 18, a relatively depleted pneumatic pressure in the drive chamber 19 is required. In this way, the transmitter piston with the plunger piston 18 can be moved back into the initial position illustrated in FIG. 1. Here, hydraulic fluid is displaced from the working chamber 8 into the accumulator chamber 9 owing to the return movement of the working piston 3. Here, the working piston 3 is likewise moved into the initial position shown in FIG. 1, likewise driven by the part piston 5 and a suitable prevailing pneumatic pressure in the pneumatic chamber 7.

The arrangement according to the present invention may basically be implemented in a hydropneumatic device for pressure transmission with structurally connected working and transmitter parts, as shown in FIG. 1, and also in systems in which the two functions are structurally separate or are connected to one another by high-pressure lines.

For the return movement of the transmitter piston 17, the required force can be realized by means of a pneumatic pressure introduced into the transmitter piston return stroke chamber or pneumatic chamber 15. For this purpose, the pressure transmitter is provided with an air spring. Since not the full pneumatic operating pressure is required for the return movement of the transmitter piston 17, the pneumatic pressure in the pneumatic chamber 15, or a so-called air spring pressure, is reduced.

In principle, the same pneumatic pressure or air spring pressure as that in the transmitter piston return stroke chamber or pneumatic chamber 15 can also act on the accumulator piston 10, whereby a hydraulic accumulator or the hydraulic fluid accommodated in the accumulator chamber 9 is kept in a state with reduced preload. Alternatively, the accumulator piston 10 may also be charged with the full operating pressure and thus kept in a state with increased preload.

Also schematically illustrated in FIG. 1 are further lines or connections which comprise an advance stroke line 23 that connects to the pneumatic chamber 6, a return stroke line 24 that connects to the pneumatic chamber 7, a line 31*a* that connects to the control chamber 12, and a hydraulic line 33 that hydraulically connects to the working chamber. The functions of these will be explained in more detail below in the description relating to FIGS. 2 to 5.

FIGS. 2 to 6 each show, for different embodiments of the present invention, a circuit diagram for an associated hydropneumatic device according to the invention for pressure transmission, the hydropneumatic device being in each case of the same basic construction as the pressure transmitter 1 from FIG. 1.

In FIGS. 2 to 6, the same reference numbers as in FIG. 1 have been used for corresponding components of the pressure transmitters according to the present invention, except for the pressure transmitter which is denoted, in FIGS. 2 to 6, by the reference number 21.

In FIGS. 2 to 6, the pressure transmitter 21 is depicted in highly schematized form, where the displaceable piston sections, or radially outer regions of at least one of the part piston 5, a piston section 5*a*, the accumulator piston 10 and the transmitter piston 17, are illustrated in one of a simplified form and as not extending as far as the inner walls of a housing of the pressure transmitter 21.

The pressure transmitter 21 has a working piston 3 in the form of a double-acting cylinder with the piston section 5*a* of the part piston 5, which piston section 5*a* extends into the working chamber 8 filled with hydraulic fluid and is thus subjected to hydraulic action.

In the case of the pressure transmitter 21 according to the present invention, the transmitter piston 17 performs the generation of force during the force stroke. By means of regulated positioning of the working piston 3 by regulation of the transmitter piston 17 on its two pneumatically charged sides, that is to say by the pressure in the pneumatic chamber 15 and the drive chamber 19, the working piston 3 can be optimally adapted to its force stroke requirements.

At the start of a working stroke of the working piston 3, the rapid-traverse stroke of the working piston 3 is performed. The working piston 3 is connected, by way of its pneumatic chambers 6 and 7 provided on both sides of the part piston 5, to a 5/2 directional valve 22, wherein the pneumatic chamber 6 can be fed with compressed air, for example, via the advance stroke line 23 and the pneumatic chamber 7 can be fed with compressed air, for example, via the return stroke line 24. Here, the 5/2 directional valve 22 forms an actuating device for the rapid-traverse stroke control.

In the advance stroke line 23 and in the return stroke line 24, between the pressure transmitter 21 and the 5/2 directional valve 22, there is provided in each case one throttling check valve 25 and 26, respectively, for setting the speed of the working piston 3.

Figure 2:
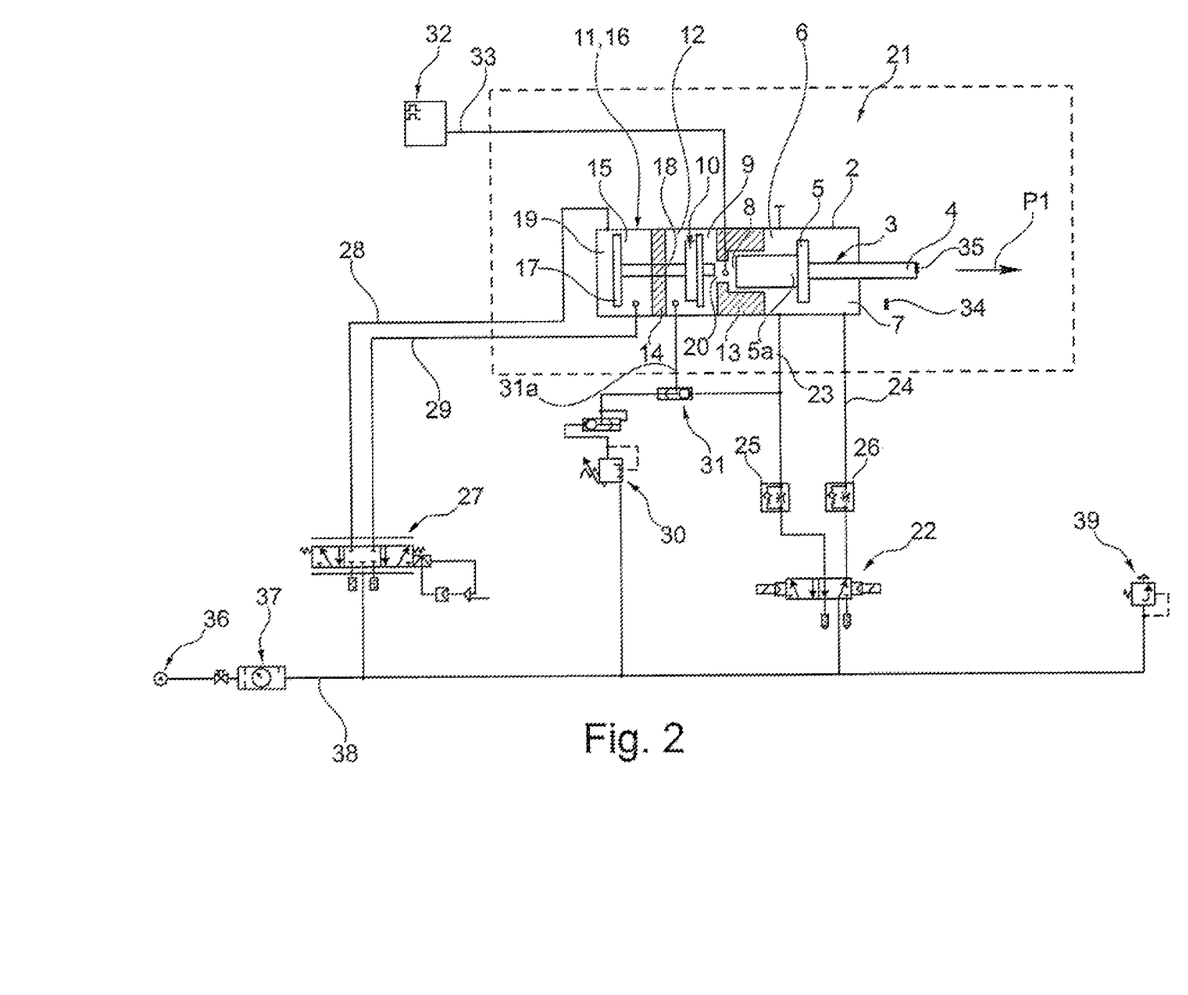
FIGS. 2 to 6 show different variants of a hydropneumatic device according to the invention for pressure transmission, illustrated in highly schematized form and with a circuit diagram.

The transmitter piston 17 is internally separated, by the partition 14, from the accumulator piston 10. The transmitter piston 17, as a double-acting pneumatic cylinder, is regulated on both sides, via the pneumatic chamber 15 and the drive chamber 19, by means of a 5/3 directional proportional valve 27, independently of the working piston 3.

Here, an advance stroke line 28 connects the 5/3 directional proportional valve 27 to the drive chamber 19, and a return stroke line 29 connects the 5/3 directional proportional valve 27 to the pneumatic chamber 15. The advance stroke line 28 and the return stroke line 29 are in this case connected to the 5/3 directional proportional valve 27 via separate ports. Furthermore, the 5/3 directional proportional valve 27 is connected via a further port to a pneumatic line 38 for the supply of pressure.

An air spring is realized in the control chamber 12, wherein the control chamber 12 is connected via the pneumatic line or line 31*a* to a shuttle valve 31, and the latter is connected to a rapid-venting means 30, or a rapid-venting valve 30, and to the advance stroke line 23. Alternatively (not illustrated), a mechanical spring may be used instead of the air spring.

The control and monitoring of an oil pressure or hydraulic fluid pressure in the working chamber 8, which is filled with hydraulic fluid, can be performed by means of an oil pressure switch 32 which is connected via the hydraulic line 33 to the working chamber 8.

For measurement of a travel as a regulating variable for the pneumatic regulation of the two sides of the transmitter piston 17, or for example of an overall stroke of the working piston 3, a travel measurement system 34, which is illustrated merely in highly schematic form, may be positioned or mounted one of in the working piston 3 and externally.

For detection or measurement of a force as a regulating variable, it is, for example, possible for a force sensor 35 to be one of mounted or externally positioned and provided on the working piston 3, for example. Alternatively or in addition, a hydraulic fluid pressure or oil pressure, if the hydraulic fluid is an oil, may be measured or detected by means of the oil pressure switch 32 and processed further as a regulating variable.

Furthermore, for the pneumatic side in the pressure transmitter 21, a pneumatic arrangement is in this case, for example, in the form of a compressed-air supply 36. The compressed-air supply 36 or the compressed air that is provided leads or is conducted into a supply or pneumatic line 38 via a supply pressure setting means 37 for the compressed air that is provided. Furthermore, for safety reasons, a safety valve 39 is provided in the pneumatic line 38.

The setting by way of the supply pressure setting means 37 ensures, for example, a minimum pressure of approximately 3 bar, which is the minimum required for the switching of the respective valves. Depending on at least one of the configuration and the dimensioning of the pressure transmitter 21, a maximum supply pressure of one of, for example, at most approximately 6 bar, and at most approximately 10 bar, is set by way of the supply pressure setting means 37.

The safety valve 39 is triggered, for example, in the presence of a maximum admissible pneumatic pressure in the pneumatic line 38 of approximately 7 bar to approximately 11 bar.

The mode of operation of the pressure transmitter 21 is as follows:

The initiation or activation of the rapid-traverse stroke of the pressure transmitter 21 is performed pneumatically by means of the 5/2 directional valve 22.

After the rapid-traverse stroke, the regulation to the force stroke is performed by means of the transmitter piston 10. This always takes place after the rapid-traverse stroke of the working piston 3 of the pressure transmitter 21 has come to an end, that is to say, for example, when the front end of the working piston or a rivet element propelled by the front end impacts against a resistance, for example a component layer. For the activation of the force stroke, the transmitter piston 17 is, by means of the 5/3 directional proportional valve 27, regulated pneumatically independently of the working piston 3. On the basis of the positive displacement principle, a relatively large force is exerted on the working piston 3, as explained above with regard to FIG. 1.

Owing to the proportional pneumatic regulation of the transmitter piston 17 on, for example, one of a travel-dependent, a force-dependent and a fluid-pressure-dependent basis, it is possible to realize highly precise positioning in the high-pressure chamber for the working piston 3. The working piston 3 can, in the force stroke, move to a predefinable position in a highly accurate manner. Here, it is advantageously furthermore possible for the transmission ratio that is realized in the pressure transmitter 21 to be regulated for indirect and very precise regulation of the working piston 3, for example, to one of a predefinable or set oil pressure, a predefinable force, a predefinable position and a predefinable travel of the working piston 3.

The region of the pressure transmitter 21 indicated by dashed lines in FIGS. 2 to 6 shows the region illustrated by way of example for the embodiment of the present invention shown in FIG. 1.

In FIGS. 3 to 6, the main elements are designed correspondingly to the arrangement shown in FIG. 2, such that substantially only the differences between the exemplary embodiments shown in FIGS. 3 to 6 and the exemplary embodiment shown in FIG. 2 will be discussed below.

Figure 3:
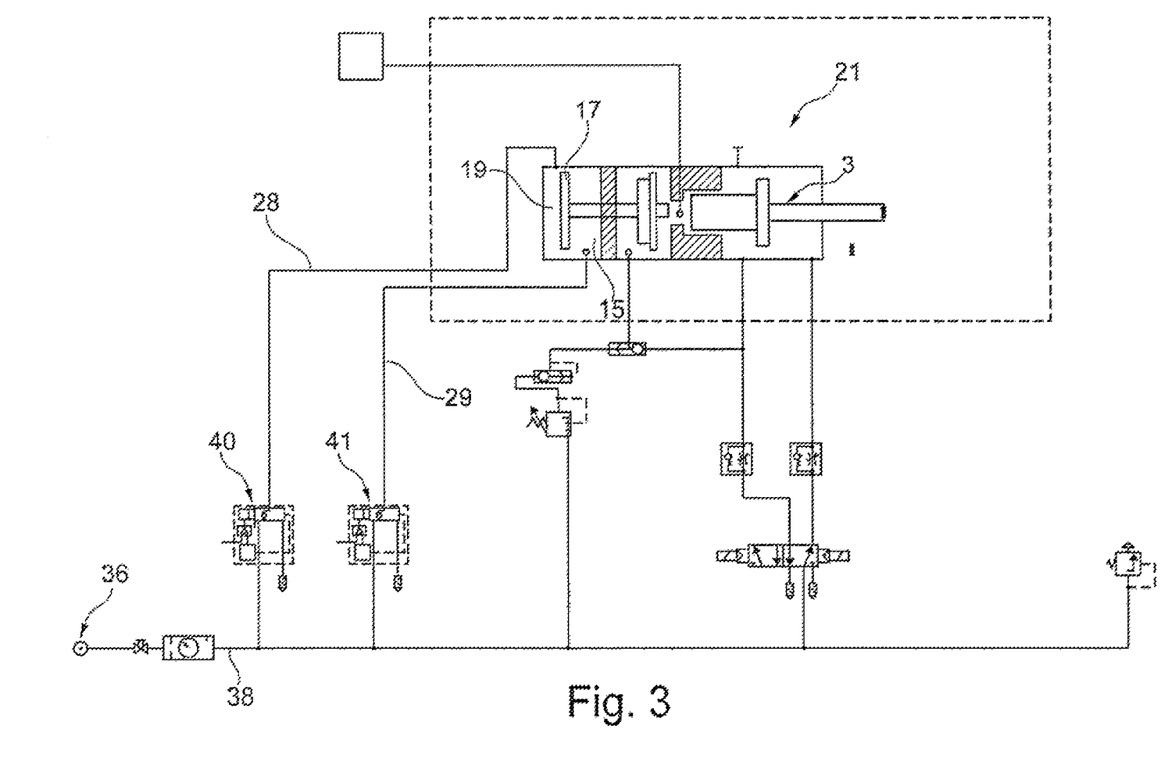

Accordingly, the embodiment according to the present invention shown in FIG. 3 concerns a pressure transmitter 21 in which, by contrast to the arrangement shown in FIG. 2, for the regulation of the transmitter piston 17, the regulation is set up for relatively large nominal diameters, for example nominal diameters greater than inch. Here, the 5/3 directional proportional valve 27 provided for the regulation in FIG. 2 has advantageously been replaced by two mutually corresponding 3/2 directional proportional valves 40 and 41.

Here, the 3/2 directional proportional valve 40 is provided on the advance stroke line 28, and the 3/2 directional proportional valve 41 is provided on the return stroke line 29.

The arrangement shown in FIG. 3 otherwise corresponds to the arrangement shown in FIG. 2 in terms of construction and also in terms of mode of operation.

Figure 4:
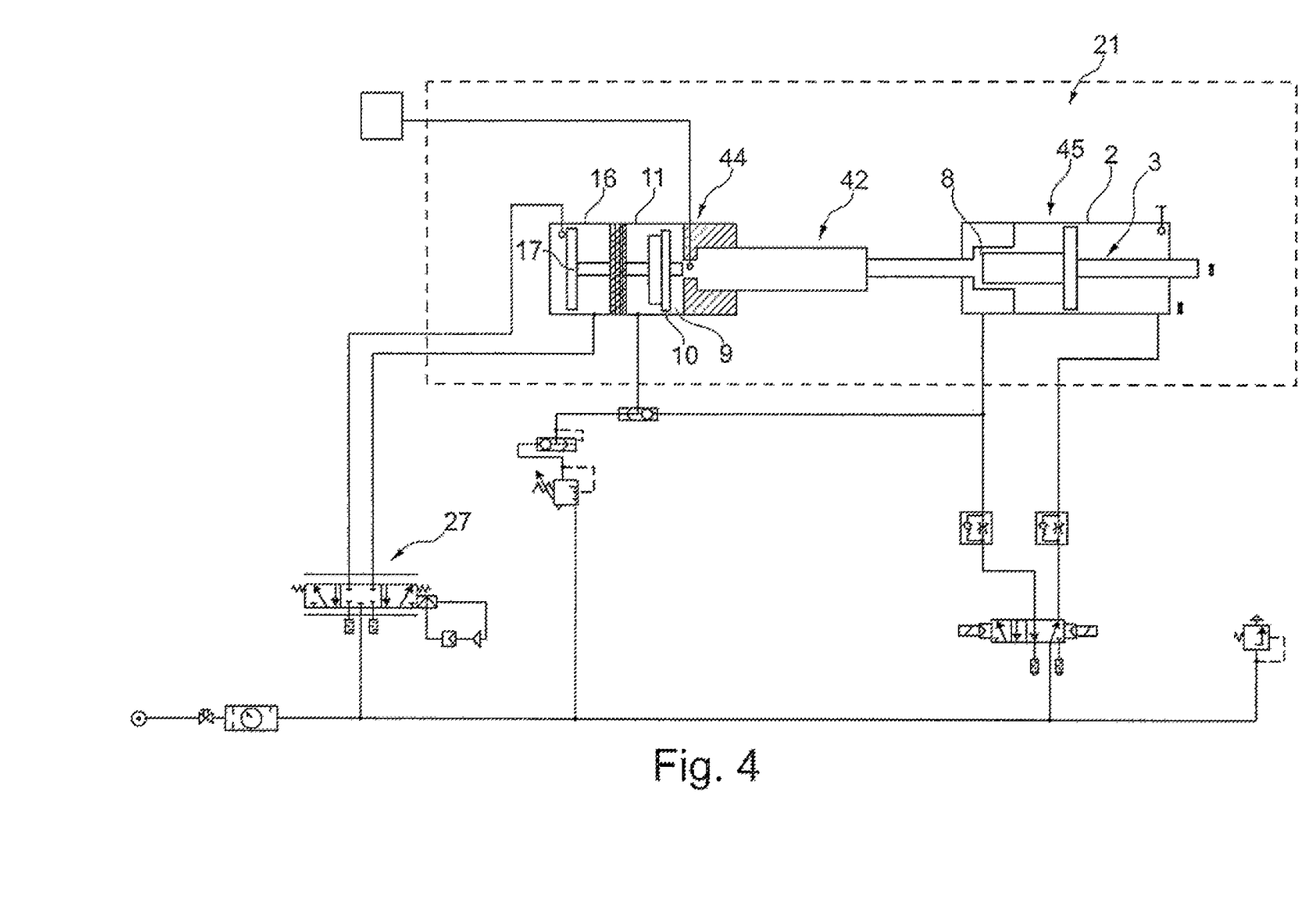

The pressure transmitter 21 according to the present invention shown in FIG. 4 differs from the arrangement shown in FIG. 2 in that the transmitter piston 17 together with accumulator piston 10, with the housing or the casing tube 11 together with housing part 13, are provided separately from the working piston 3 together with housing 2, that is to say a transmitter component 44 that can be provided separately and a working component 45 that can be provided separately, which transmitter component and working component are connected to one another in flexible and/or rigid fashion by means of a corresponding hydraulic connection 42.

Figure 5:
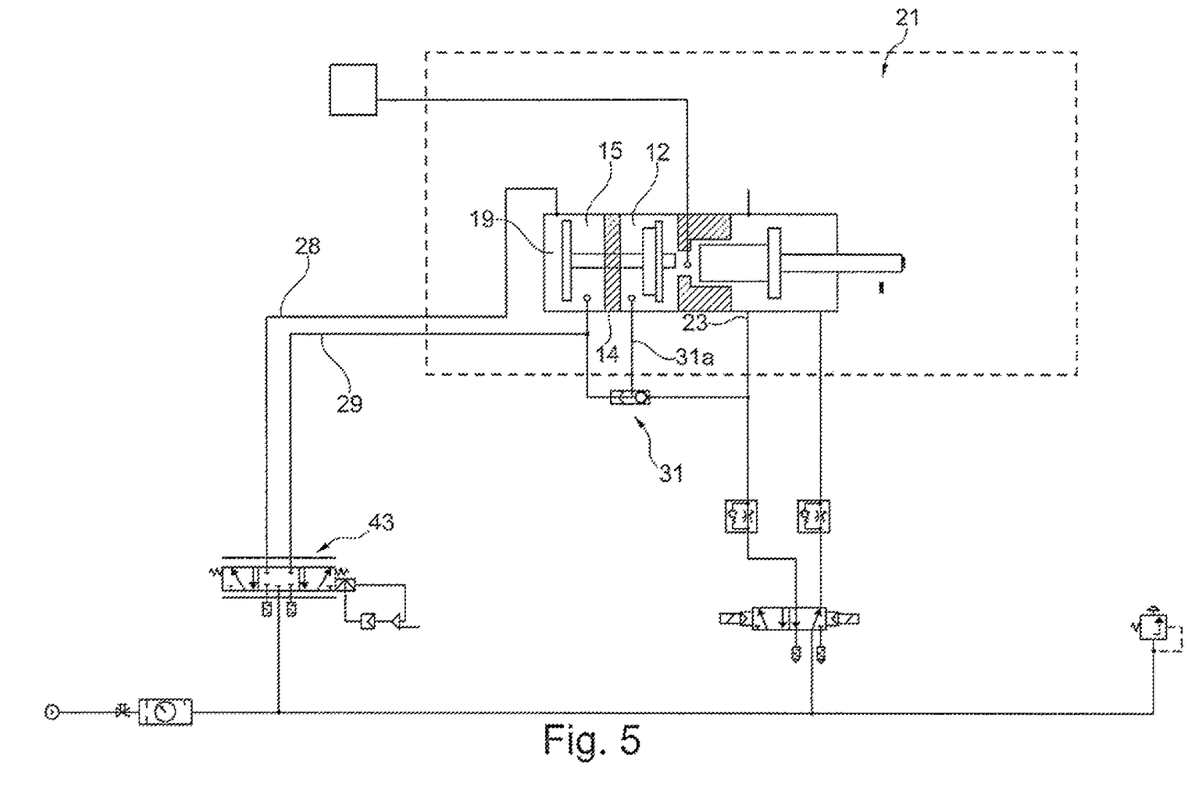

A further advantageous variant of the present invention or of a pressure transmitter 21 according to the present invention is shown in FIG. 5. Here, the accumulator piston 10 is moved pneumatically by means of a 5/3 directional proportional valve 43. Here, the 5/3 directional proportional valve 43 performs not only the regulation of the transmitter piston 17, as described with regard to FIG. 2, but also the pneumatic feed to the control chamber 12. Accordingly, the rapid-venting valve 30 provided in FIG. 2 is dispensed with. The shuttle valve 31 is correspondingly connected to the pneumatic chamber 15 and permits a selective connection to the return stroke line 29 and to the advance stroke line 23.

Figure 6:
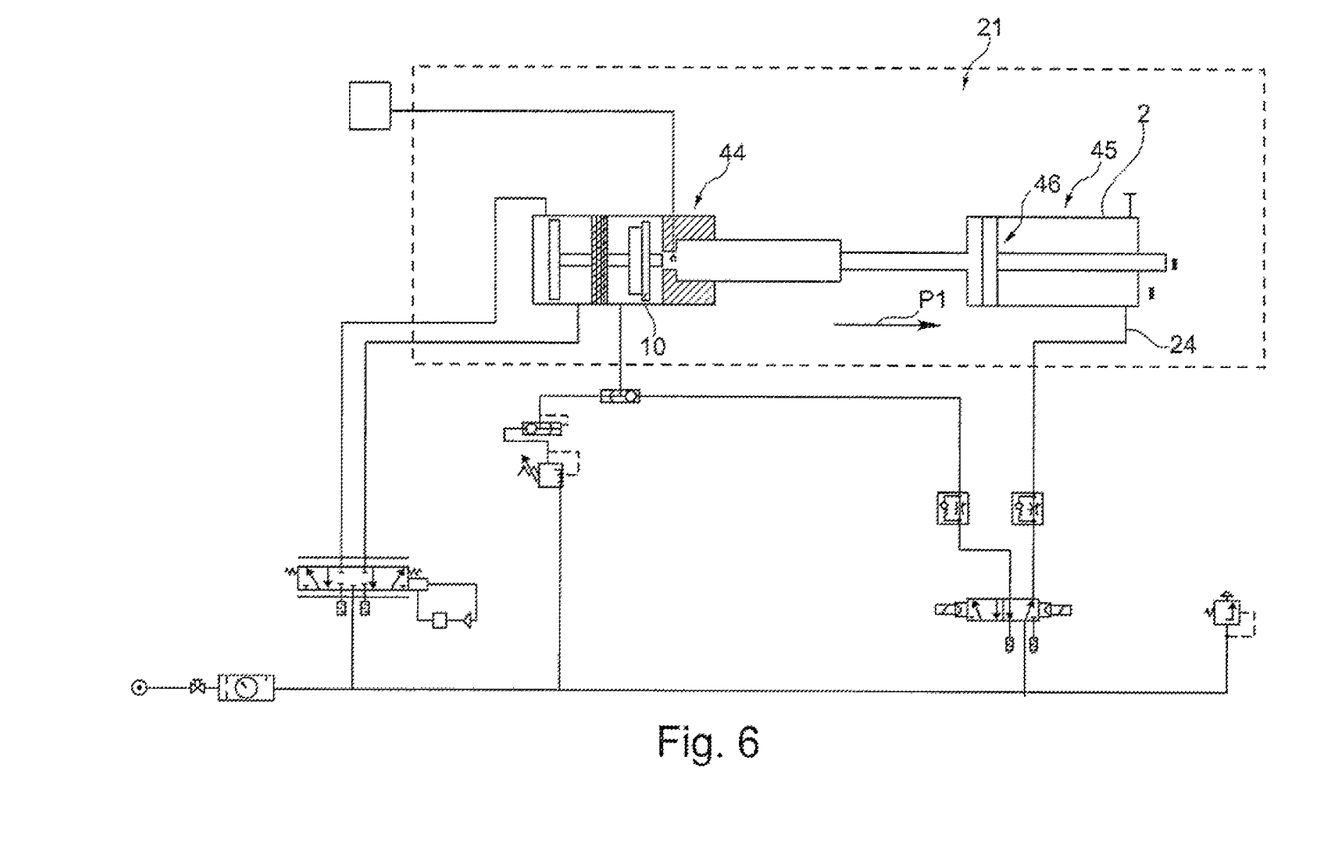

The pressure transmitter 21 according to the invention shown in FIG. 6, which shows a further separate solution with a transmitter component 44 and a working component 45, differs from the pressure transmitter 21 as per FIG. 4 merely in that a hydraulic cylinder 46 in the form of a double-acting cylinder is accommodated in displaceable fashion in the housing 2 of the working component 45. The hydraulic cylinder 46 is, on one side, subjected to hydraulic action only by means of the hydraulic fluid that is also dipped into by the accumulator piston 10. Accordingly, one side of the hydraulic cylinder 46 communicates with the accumulator piston 10, wherein the other side of the hydraulic cylinder 46 is subjected to pneumatic action via the return stroke line 24, as in the case of the pressure transmitter 21 shown in FIG. 4.

Accordingly, the rapid-traverse stroke is effected exclusively by the accumulator piston 10 moving in the direction P1. The return stroke is, as in the other variants shown in FIGS. 1 to 5, effected pneumatically, wherein hydraulic fluid is displaced in the direction of the accumulator piston 10 and the latter is likewise subjected to a return movement.

Figure 7:
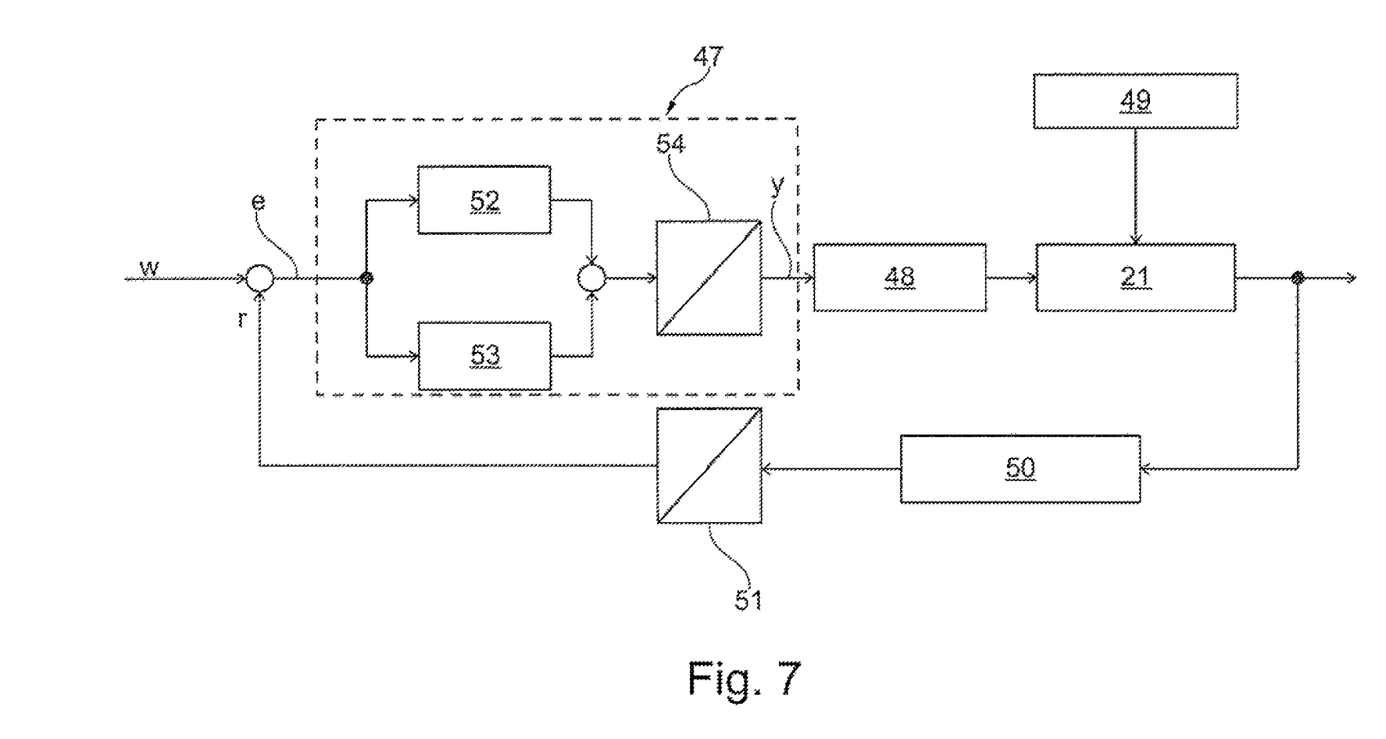
FIG. 7 is a schematic diagrammatic illustration with a regulation loop for a hydropneumatic device according to the invention for pressure transmission.

FIG. 7 shows, in a diagrammatic illustration, a regulation loop for a hydropneumatic device according to the present invention for pressure transmission, or a pressure transmitter 21, which is controlled by means of a regulating device 47 indicated by a dashed border, for example, by means of a multi-directional valve 48. During operation in practice, disturbance variables 49 such as, for example, mechanical variables can act on the pressure transmitter 21. The disturbance variables may arise for example as a result of bending or compression of material, owing to seals or owing to air in the hydraulic fluid.

By way of sensor means comprising, for example, one of a travel sensor, a force sensor and an oil pressure sensor, or by way of a sensor arrangement 50, a regulating variable such as, for example, a stroke travel of the working piston is detected in analog form and, in this case, is converted by means of an analog-digital converter 51. From the regulating variable r provided in digital form and a predefinable guide variable w, a regulating deviation e is formed. The regulating deviation e is processed by means of the regulating device 47, which in this case comprises, by way of example, a proportional part 52 and an integral part 53, and the regulating deviation is converted by means of a digital-analog converter 54 of the regulating device 47 into an analog actuation variable y. The actuation variable y acts on the multi-directional valve 48, by means of which the regulation of the pressure transmitter 21 is performed.

LIST OF REFERENCE SIGNS

1 Pressure transmitter
2 Housing
3 Working piston
4 Piston rod
5 Part piston
5a Piston section
6 Pneumatic chamber
7 Pneumatic chamber
8 Working chamber
9 Accumulator chamber
10 Accumulator piston
10a Annular groove
10b Annular groove
11 Casing tube
12 Control chamber
13 Housing part
13a Radial seal
14 Partition
15 Pneumatic chamber
16 Casing tube
17 Transmitter piston
18 Plunger piston
19 Drive chamber
20 Connecting bore
21 Pressure transmitter
22 5/2 directional valve
23 Advance stroke line
24 Return stroke line
25 Throttling check valve
26 Throttling check valve
27 5/3 directional proportional valve
28 Advance stroke line
29 Return stroke line
30 Rapid-venting means
31 Shuttle valve
31a Line
32 Oil pressure switch
33 Hydraulic line
34 Travel measurement system
35 Force sensor
36 Compressed-air supply
37 Supply pressure setting means
38 Pneumatic line
39 Safety valve
40 3/2 directional proportional valve
41 3/2 directional proportional valve
42 Hydraulic Connection
43 5/3 directional proportional valve
44 Transmitter component
45 Working component
46 Hydraulic cylinder
47 Regulating device
48 Multi-directional valve
49 Disturbance variable
50 Sensor arrangement
51 Analog-digital converter
52 Proportional part
53 Integral part
54 Digital-analog converter

The invention claimed is:

1. A hydropneumatic device for pressure transmission comprising: a working piston; and
   a transmitter piston, which is a double-acting cylinder and transmits pressure to the working piston,
   wherein a working stroke of the working piston in a working direction comprises a first stroke and a subsequent second stroke,
   wherein the first stroke is controlled by pneumatic pressure action on the working piston, and the second stroke is controlled by pneumatic pressure action on the transmitter piston,
   wherein hydraulic fluid is displaced by the transmitter piston and the displaced hydraulic fluid effects the second stroke of the working piston,
   wherein regulation means having an actuating device are provided to regulate the pneumatic pressure on both sides of the double-acting cylinder of the transmitter piston such that the second stroke of the working piston is predefined by the resultant regulation of the regulation means,
   wherein, in the second stroke, a precise position of the working piston is provided by double-sided pneumatic regulation of the transmitter piston, and
   wherein the working piston is thereby moved into a predefined position with a desired movement profile.

2. The hydropnuematic device according to claim 1, wherein a chamber that accommodates the transmitter piston is separated from a chamber that accommodates an accumulator piston.

3. The hydropneumatic device according to claim 1, wherein the actuating device of the regulation means comprises a multi-directional valve.

4. The hydropneumatic device according to claim 1, wherein the actuating device of the regulation means comprises precisely one multi-directional proportional valve.

5. The hydropneumatic device according to claim 1, wherein the actuating device of the regulation means comprises a plurality of interacting multi-directional valves.

6. The hydropneumatic device according to claim 1, further comprising sensor means which have a travel sensor arrangement by means of which a travel is detected, wherein the travel is a regulating variable of the regulation means.

7. The hydropneumatic device according to claim 1, further comprising sensor means which have a force sensor arrangement by means of which a force is detected, wherein the force is a regulating variable of the regulation means.

8. The hydropneumatic device according to claim 1, further comprising sensor means which have a pressure sensor arrangement by means of which a pressure is detected, wherein the pressure is a regulating variable of the regulation means.

9. The hydropneumatic device according to claim 2, wherein one side of the accumulator piston, which is a double-acting cylinder, is subjected to pneumatic pressure that can be regulated.

10. The hydropneumatic device according to claim 2, wherein one side of the accumulator piston, which is a double-acting cylinder, is subjected to pneumatic pressure acting thereon, and is regulated by the actuating means of the regulation means by regulating the pneumatic pressure on both sides of the double-acting cylinder of the transmitter piston.

11. The hydropneumatic device according to claim 1, wherein the working piston is movably accommodated in a working piston housing of a first structural unit, which is separate from a second structural unit which has an auxiliary piston housing in which the transmitter piston and the accumulator piston are accommodated, and wherein the first and the second structural units communicate hydraulically with one another via a connecting section.

12. A device for one of clinching and riveting, the device comprising:
   a driveable working piston for establishing one of a clinched arrangement and a riveted arrangement with a rivet element; and
   a hydropneumatic device according to claim 1.

13. A device for at least one of pressing, pressing-in, embossing, compacting, stamping, calking, clinching, punching and perforating, the device comprising:
   a driveable working piston; and
   a hydropneumatic device according to claim 1.

14. The hydropneumatic device according to claim 2, wherein the actuating device of the regulation means comprises a multi-directional valve.

15. The hydropneumatic device according to claim 4, wherein the one multi-directional proportional valve is a 5/3 directional proportional valve.

16. The hydropneumatic device according to claim 5, wherein the plurality of interacting multi-directional valves are 3/2 directional proportional valves.

\* \* \* \* \*